US011879770B2

(12) United States Patent
Ji et al.

(10) Patent No.: US 11,879,770 B2
(45) Date of Patent: Jan. 23, 2024

(54) WEIGHING METHOD WITH AUTOMATIC MICRO-CALIBRATION FUNCTION

(71) Applicants: Mettler-Toledo (Changzhou) Precision Instruments Ltd, Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Zhengwei Ji, ChangZhou (CN); Chunhui Li, ChangZhou (CN); ZhiHe Chao, Changzhou (CN)

(73) Assignees: Mettler-Toledo (Changzhou) Precision Instruments Ltd, Changzhou (CN); Mettler-Toledo (Changzhou) Measurement Technology Ltd., Changzhou (CN); Mettler-Toledo International Trading (Shanghai) Co., Ltd, Shanghai (CN)

( * ) Notice: Subject to any disclaimer, the term of this patent is extended or adjusted under 35 U.S.C. 154(b) by 249 days.

(21) Appl. No.: 17/249,768

(22) Filed: Mar. 12, 2021

(65) Prior Publication Data
US 2021/0293609 A1    Sep. 23, 2021

(30) Foreign Application Priority Data

Mar. 18, 2020    (CN) .......................... 202010190356.1

(51) Int. Cl.
G01G 23/01    (2006.01)
G01G 13/02    (2006.01)

(52) U.S. Cl.
CPC ........... *G01G 23/01* (2013.01); *G01G 13/022* (2013.01)

(58) Field of Classification Search
CPC ...... G01G 23/01; G01G 13/022; G01G 23/16; G01G 23/163
See application file for complete search history.

(56) References Cited

U.S. PATENT DOCUMENTS 4,630,696 A * 12/1986 Kemnitz ................ G01G 23/01
177/1
4,667,503 A *  5/1987 Loos ..................... G01G 19/24
366/141
4,706,767 A * 11/1987 Chou .................. G01G 23/3707
177/164
4,842,085 A *  6/1989 Lang .................. G01G 23/3707
177/164

(Continued)

Primary Examiner — Randy W Gibson
(74) Attorney, Agent, or Firm — Standley Law Group LLP; Jeffrey S. Standley; Adam J. Smith

(57) ABSTRACT

A weighing method has an automatic micro-calibration function. In the method, an automatic adjustment is performed by a self-calibration weighing module. When the result of the adjustment does not meet a requirement, an automatic calibration is performed by the self-calibration weighing module, followed by weighing fine formulation materials. In the weighing method, the self-calibration module is used to perform the automatic calibration function to weigh the fine formulation materials. This provides a high degree of automation, and greatly reduced cost in equipment and labor for a formulating process, saving on time and labor, and with no risk of cross-contamination.

10 Claims, 3 Drawing Sheets

(56) References Cited

U.S. PATENT DOCUMENTS

| | | | | |
|---|---|---|---|---|
| 4,981,187 A * | 1/1991 | Masuyama | ........ | G01G 23/3707 |
| | | | | 73/862.52 |
| 5,775,532 A * | 7/1998 | Bullivant | ................ | G01G 23/01 |
| | | | | 73/863.55 |
| 6,284,987 B1 * | 9/2001 | Al-Modiny | ........... | F17C 13/023 |
| | | | | 177/171 |
| 6,636,820 B2 | 10/2003 | Livingston | | |
| 7,845,516 B2 * | 12/2010 | Pessin | .................... | B65G 65/34 |
| | | | | 366/8 |
| 8,829,365 B1 * | 9/2014 | Wallace | ................. | G01G 19/56 |
| | | | | 177/25.14 |
| 2007/0007050 A1 * | 1/2007 | Reber | .................... | G01G 23/01 |
| | | | | 177/212 |
| 2009/0039106 A1 | 2/2009 | Moretto | | |

\* cited by examiner

WEIGHING METHOD WITH AUTOMATIC MICRO-CALIBRATION FUNCTION

CROSS-REFERENCE TO RELATED APPLICATIONS

This application is a non-provisional application that claims priority to Chinese application 202010190356.1, filed 18 Mar. 2020, which is incorporated by reference as if fully recited herein.

TECHNICAL FIELD

The invention relates to the field of weighing modules, and in particular to a weighing method with an automatic micro-calibration function.

BACKGROUND ART

Weighing modules are widely applied in various industries due to their advantages of having a compact structure, being easily integrated, providing accurate weighing, etc. A weighing module is usually integrated at the bottom of a container (a material tank, a feed bin, a reaction kettle, etc.), and weighing the materials in the container is done by a weighing sensor inside the weighing module.

For food, pharmaceutical, fine chemical and other industries, it is required to weigh not only fine formulation materials, but also relatively heavy reaction solvents in a formulating process. Several parts of materials are finally mixed to complete the formulating process. The capacity and precision of a material tank scale depend on the weight of the material tank itself and the weight to be weighed inside the tank. Piping of a formulating tank is generally relatively heavy, resulting in a relatively large capacity of the corresponding weighing module. Therefore, using a material tank scale with a relatively large capacity to weigh fine materials cannot meet the precision requirement (this utilization is called "weighing small weight with large tare weight").

Therefore, a single material tank scale cannot meet production requirements for formulating materials in the above industries. Generally, multiple material tank scales with different capacities need to be used, i.e., small-capacity material tank scales or platform scales are used to weigh small-weight fine formulation materials separately, then large-capacity material tank scales are used to weigh large-weight solvent materials, and then the weighed one or more fine materials and solvent materials are mixed to finish the formulating process. Such a process method requires multiple weighing apparatuses, and at the same time, the method is not high in the degree of automation and has the disadvantages of high cost, low efficiency, complicated process, etc.

In addition, for the above industries, as required by industry standards or national regulations (such as GMP and FDA), an adjustment at a short cycle (on a daily basis or once every few days) is required for material tank scales for formulating materials. A current practice is to adjust the scales by manually adding weights. This method is time and labor consuming, and has the risk of cross-contamination.

For example, in a conventional formulating process, since the maximum capacity of weighing of a material-tank weighing system itself is about 4000 kg, and the precision thereof is $1/1000$, the minimum scale interval of the material-tank weighing system is 4 kg and the displayed scale interval is 0.4 kg. However, since the adjusted value of the material-tank weighing system itself must meet the precision for the maximum range of 4000 kg, the precision of weighing fine materials (e.g., 1 kg of material A and 2 kg of material B) cannot be ensured. During a conventional formulating process, the weight of fine materials is weighed by a further small-capacity scale (e.g., a 50 kg platform scale), then the fine materials are manually added to the material tank, and finally 3000 kg of water is added to the material tank through a feeding system of the material tank to finish the feeding process, and then process steps of stirring, heating, drying, etc. are carried out to complete the formulating.

In view of this, those skilled in the art have made improvements on the conventional weighing methods for weighing a small weight with a large tare weight, and a weighing method with an automatic micro-calibration function is provided.

SUMMARY OF THE INVENTION

The technical problem to be resolved by the present invention is: in order to overcome the shortcomings of low degree of automation, high cost, low efficiency, complicated process and the like of a weighing method for weighing a small weight with a large tare weight in the prior art, providing a weighing method with an automatic micro-calibration function.

The present invention solves the above technical problems through the following technical solution: a weighing method with an automatic micro-calibration function, characterized in that the weighing method comprises: performing an automatic adjustment by a self-calibration weighing module, and when the result of the adjustment does not meet a requirement, performing automatic calibration by the self-calibration weighing module, and weighing fine formulation materials after the calibration is finished.

According to one embodiment of the present invention, the weighing method comprises the steps of:

$S_1$. installing and connecting a material tank to the self-calibration weighing module and a control system;

$S_2$. sending, by the control system, an automatic adjustment instruction to the self-calibration weighing module;

$S_3$. loading the material tank by the self-calibration weighing module, and displaying loaded weight data and determining whether the result of the adjustment meets a requirement, by the control system, if not, proceeding to step S4, and if yes, proceeding to step S5;

$S_4$. instructing, by the control system, the self-calibration weighing module to perform automatic calibration, and proceeding to $S_5$ after the calibration is finished;

$S_5$. performing weighing control on the fine formulation materials by a feeding system of the material tank; and $S_6$. switching, by the control system, back to calibrated data of the material tank, and weighing large-weight mixed solvent materials.

According to one embodiment of the present invention, the control system comprises a meter or a PLC control system.

According to one embodiment of the present invention, step $S_2$ particularly comprises: triggering an internal software control program by the meter through a mechanical meter button or by the PLC control system through a virtual key, and sending, by the software control program, a signal to an automatic loading device of the self-calibration weighing module.

According to one embodiment of the present invention, step $S_3$ particularly comprises the steps of:

$S_{31}$. performing a loading action by the automatic loading device after receiving the signal; and $S_{32}$. after loading, displaying loaded weight data by the meter or the PLC control system, comparing the loaded weight data with the mass of loaded weights for the self-calibration weighing module to obtain a weight deviation value, and if the weight deviation value does not meet a requirement, proceeding to step $S_4$; and if the weight deviation value meets the requirement, proceeding to step $S_5$.

According to one embodiment of the present invention, step $S_4$ particularly comprises: sending an automatic small-range calibration instruction by the meter or the PLC control system, and performing calibration by the self-calibration weighing module by loading weights, such that the precision meets a precision for small-range weighing.

According to one embodiment of the present invention, the weighing method comprises the steps of:

$S_{1'}$. installing and connecting a material tank to the self-calibration weighing module and a control system;

$S_{2'}$. calibrating data of the material tank by the self-calibration weighing module and weighing large-weight mixed solvents;

$S_{3'}$. switching, by the control system, the self-calibration weighing module to an automatic small-range calibration mode, and performing small-range calibration by the self-calibration weighing module by taking a current weight of the material tank as a zero point;

$S_{4'}$. sending, by the control system, an automatic adjustment instruction to the self-calibration weighing module;

$S_{5'}$. loading the material tank by the self-calibration weighing module, and displaying loaded weight data and determining whether the result of the adjustment meets a requirement, by the control system, if not, proceeding to step $S_{6'}$, and if yes, proceeding to step $S_{7'}$;

$S_{6'}$. instructing, by the control system, the self-calibration weighing module to perform automatic calibration, and proceeding to step $S_{7'}$ after the calibration is finished; and $S_{7'}$. performing weighing control on the fine formulation materials by a feeding system of the material tank.

According to one embodiment of the present invention, the control system comprises a meter or a PLC control system.

According to one embodiment of the present invention, step $S_{4'}$ particularly comprises: triggering an internal software control program by the meter through a mechanical meter button or by the PLC control system through a virtual key, and sending, by the software control program, a signal to an automatic loading device of the self-calibration weighing module.

According to one embodiment of the present invention, step $S_{5'}$ particularly comprises the steps of:

$S_{51'}$. performing a loading action by the automatic loading device after receiving the signal; and $S_{52'}$. after loading, displaying loaded weight data by the meter or the PLC control system, comparing the loaded weight data with the mass of loaded weights for the self-calibration weighing module to obtain a weight deviation value, and if the weight deviation value does not meet a requirement, proceeding to step $S_{6'}$; and if the weight deviation value meets the requirement, proceeding to step $S_{7'}$.

The positive improvement effects of the present invention include the following: in the weighing method with an automatic micro-calibration function according to the present invention, the self-calibration module is used to perform the automatic calibration function to weigh the fine formulation materials, having a high degree of automation, and greatly reducing cost in equipment and labor for a formulating process, saving on time and labor, and having no risk of cross-contamination.

BRIEF DESCRIPTION OF THE DRAWINGS

The above and other features, properties and advantages of the present invention will become clearer based on the description below in conjunction with the drawings and embodiments, and the same reference numerals in the figures always represent the same features, in which.

DETAILED DESCRIPTION OF EMBODIMENTS

Figure 1:
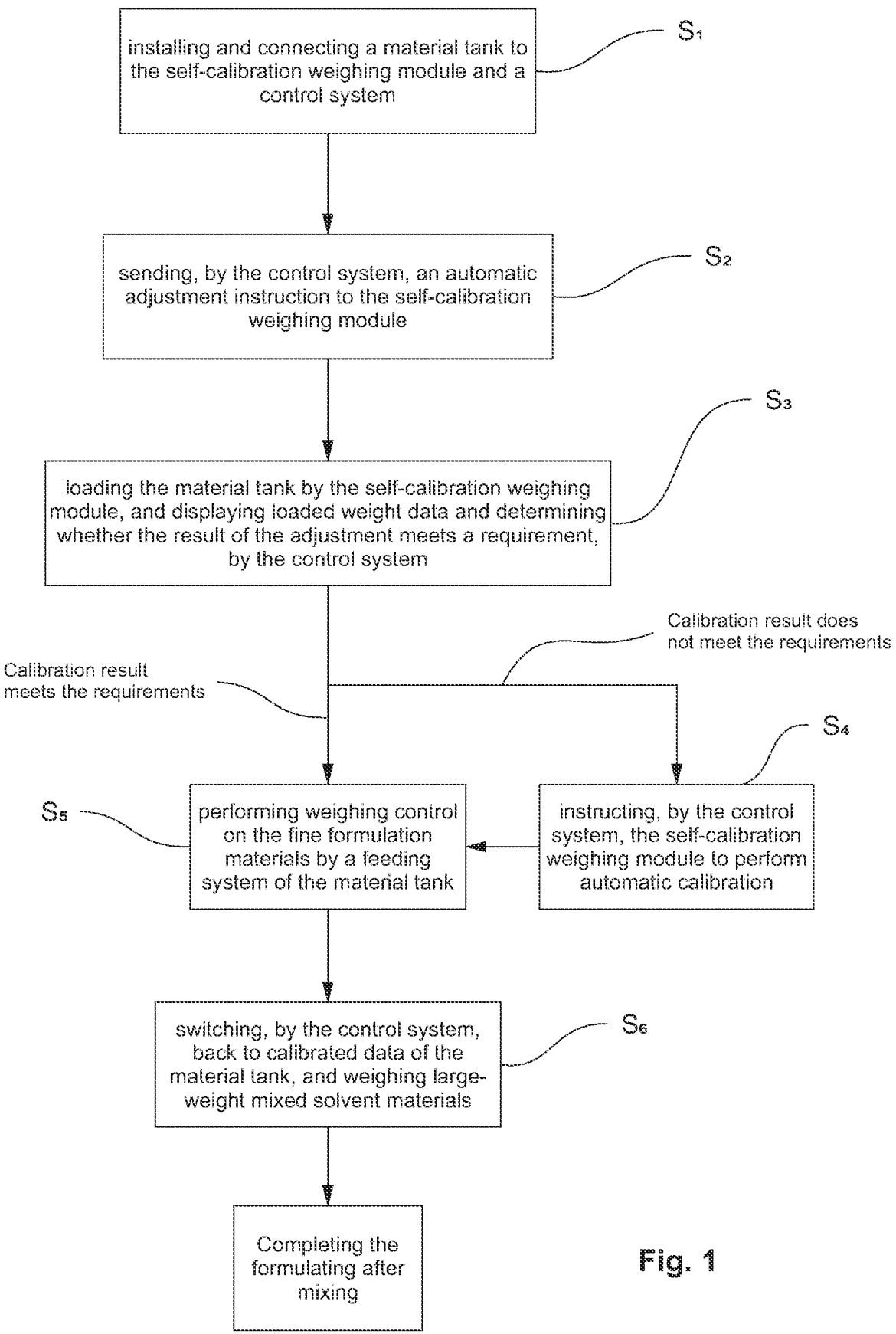
FIG. 1 is a flowchart of Embodiment I of a weighing method with an automatic micro-calibration function according to the present invention.

To make the above objectives, features and advantages of the present invention more apparent and easier to understand, specific implementations of the present invention will be described in detail below in conjunction with the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the drawings denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

Embodiment I

Figure 3A:
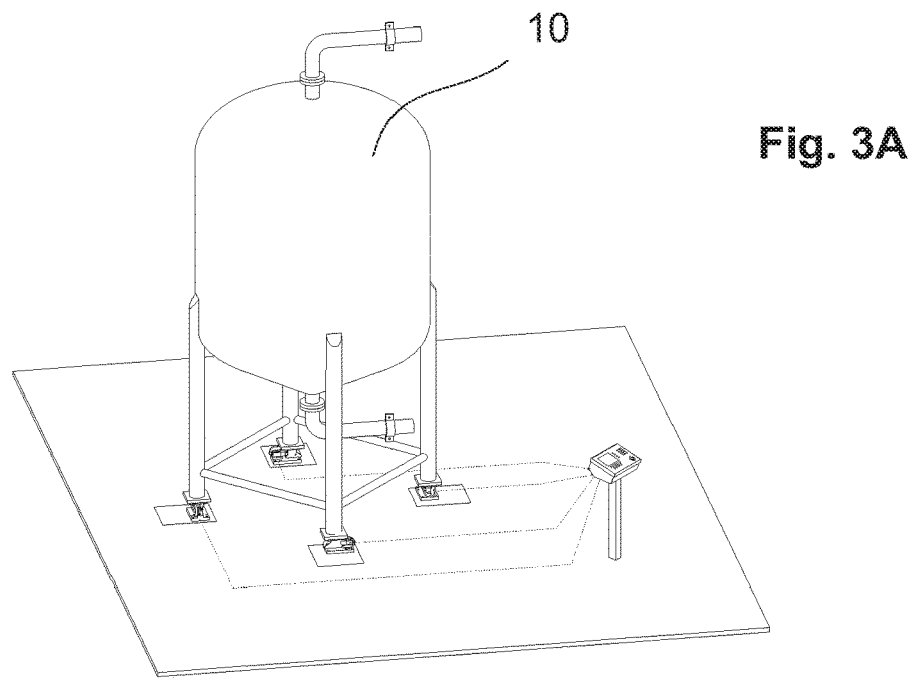
FIG. 3A is an exemplary material tank scale for use with the methods of FIGS. 1-2.
Figure 3B:
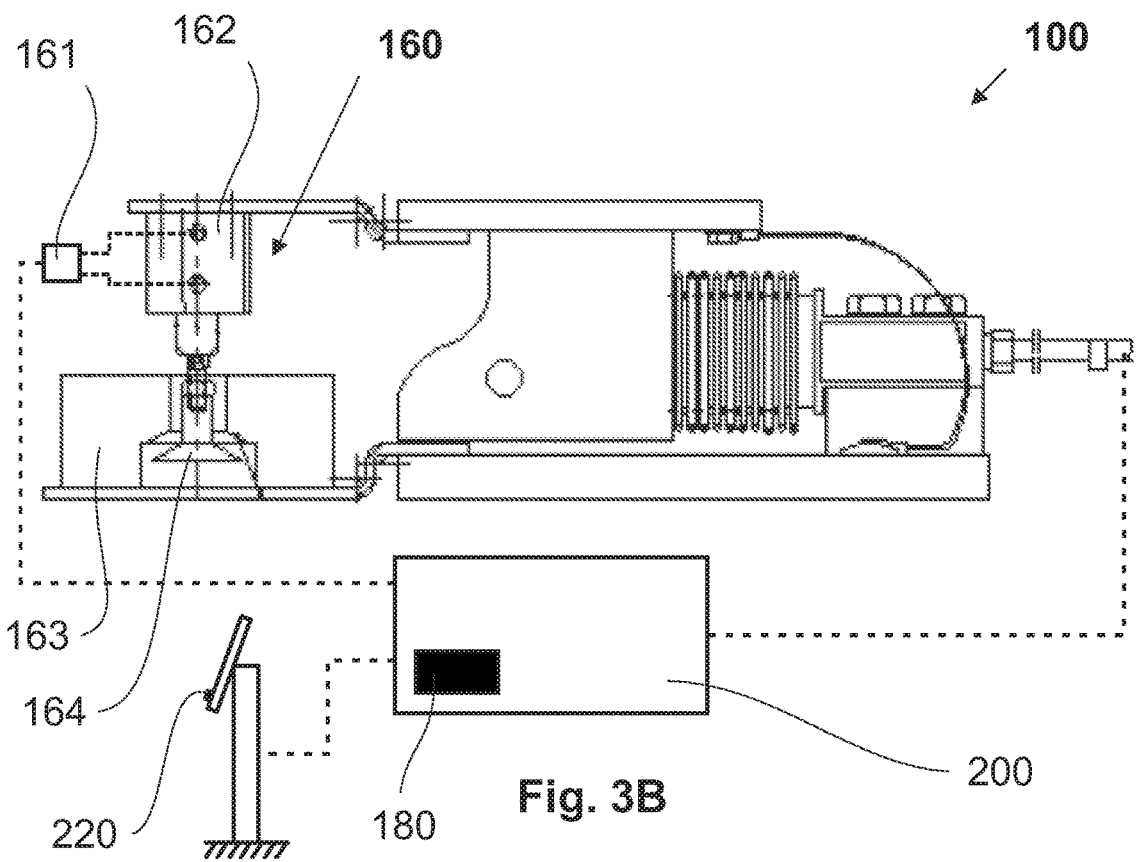
FIG. 3B is an exemplary weighing device for use with the methods of FIGS. 1-2.

FIG. 1 is a flowchart of Embodiment I of a weighing method with an automatic micro-calibration function according to the present invention. The method may be carried out on a weighing device 10, such as illustrated in FIG. 3A by way of non-limiting example.

The present invention discloses a weighing method with an automatic micro-calibration function, the method comprising: performing an automatic adjustment by a self-calibration weighing module 120, and when the result of the adjustment does not meet a requirement, performing automatic calibration by the self-calibration weighing module 120, and weighing fine formulation materials after the calibration is finished.

Specifically, in this embodiment, the weighing method comprises six steps.

The first step, $S_1$, is installing and connecting a material tank 10 to the self-calibration weighing module 100 and a control system 200.

The control system 200 preferably comprises a meter or a PLC control system. Before formulating starts, the material tank 10, the self-calibration weighing module 100 and the control system 200 (such as a meter or a PLC) have been installed, and a feeding system and a discharging system and other auxiliary systems of the material tank 10 have been installed.

The second step, $S_2$, is sending, by the control system 200, an automatic adjustment instruction to the self-calibration weighing module 100.

Preferably, step $S_2$ particularly comprises: triggering an internal software control program by the meter through a mechanical meter button 220 or by the PLC control system through a virtual key 180, and sending, by the software control program, a signal to an automatic loading device 160 of the self-calibration weighing module 100. After the automatic loading device 160 receives a signal from a meter or a PLC, for example, as the automatic loading device 160 comprises an electromagnetic valve 161 and a cylinder, the electromagnetic valve 161 is powered on to open a compressed air passage of the cylinder 162, and the cylinder 162 lifts weights 163 upwards through a weight connecting piece 164 to finish a loading action.

The third step, $S_3$, is loading the material tank 10 by the self-calibration weighing module 100, and displaying loaded weight data and determining whether the result of the adjustment meets a requirement, by the control system 200, if not, proceeding to step $S_4$, and if yes, proceeding to step $S_5$.

Preferably, step $S_3$ particularly comprises substeps. Substep $S_{31}$ involves performing a loading action by the automatic loading device 160 after receiving the signal. Substep $S_{32}$ involves, after loading, displaying loaded weight data by the meter or the PLC control system, comparing the loaded weight data with the mass of loaded weights 163 for the self-calibration weighing module 100 to obtain a weight deviation value, and if the weight deviation value does not meet a requirement, proceeding to step $S_4$; and if the weight deviation value meets the requirement, proceeding to step $S_5$.

The fourth step, $S_4$, is instructing, by the control system 200, the self-calibration weighing module 100 to perform automatic calibration, and proceeding to step $S_5$ after the calibration is finished.

Preferably, step $S_4$ particularly comprises: sending an automatic small-range calibration instruction by the meter or the PLC control system, and performing calibration by the self-calibration weighing module 100 by loading weights 163, such that the precision meets a precision for small-range weighing.

In this case, it is equivalent to the case where the maximum weighing (e.g., 4-8 kg) precision of the whole material-tank weighing system meets the precision for small-range weighing, and weighing control of fine formulation materials is performed after the calibration is finished. The feeding process is: weighing control on fine formulation materials (e.g., 1 kg of material A or 2 kg of material B) is performed by a feeding system of the material tank 10. When the weight of the fine materials added meets a requirement, the system stops feeding.

The fifth step, $S_5$, is performing weighing control on the fine formulation materials by a feeding system of the material tank 10.

When the deviation value meets the production requirements, micro-calibration of the material-tank weighing system is not required, and weighing control on the fine formulation materials (e.g., 1 kg of material A or 2 kg of material B) is directly performed by a feeding system of the material tank 10. When the weight of the fine materials added meets a requirement, the system stops feeding.

The sixth step, $S_6$, is switching, by the control system 200, back to calibrated data of the material tank 10, and weighing large-weight mixed solvent materials.

Preferably, the weighing process of the large-weight mixed solvents is performed after it is switched through the meter or the PLC back to main material-tank scale data, and the weighing control on the large-weight (e.g., 3000 kg of water) mixed solvents is performed. After all materials have been fed, stirring, heating and other processes are carried out to complete the formulating process.

Embodiment II

Figure 2:
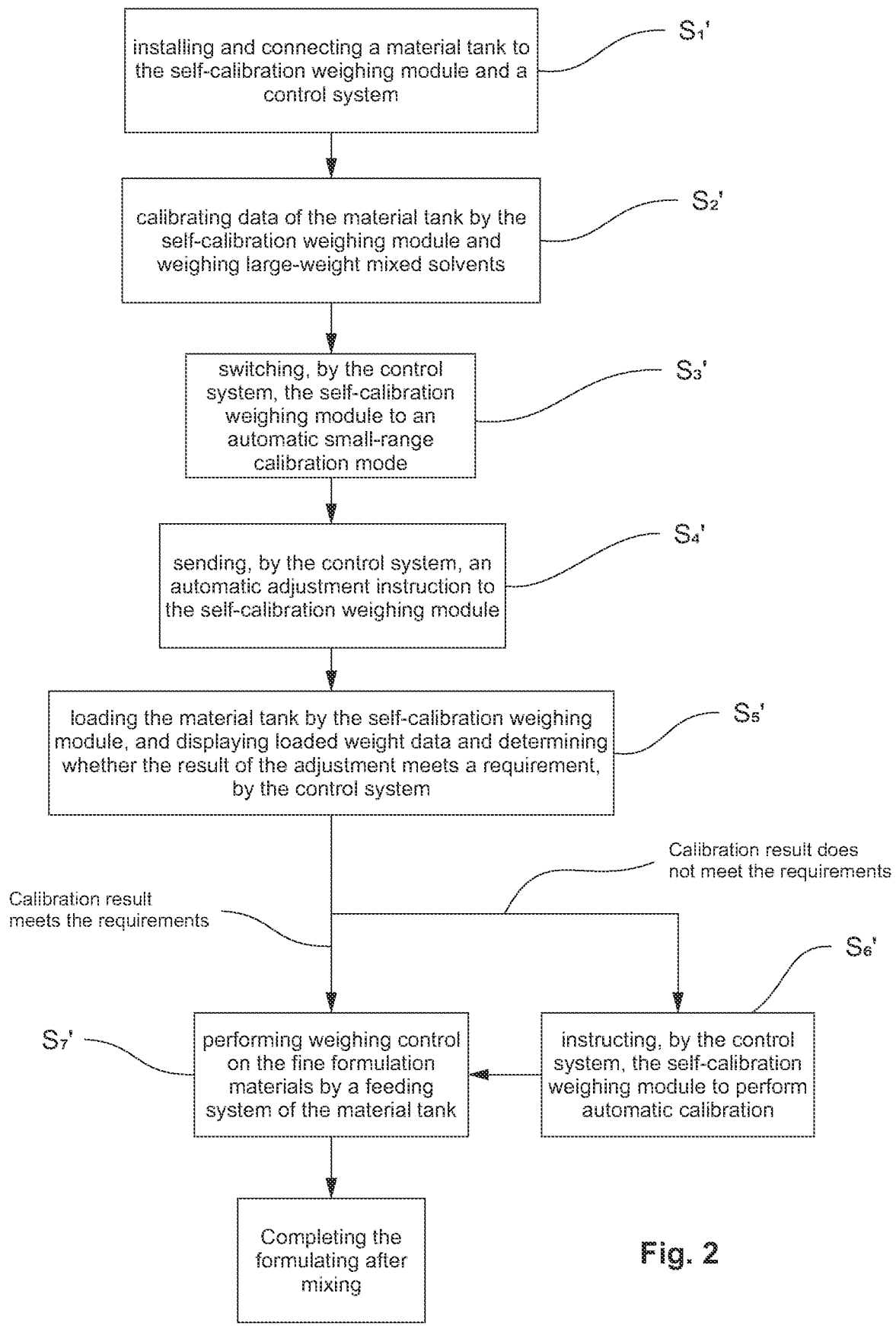
FIG. 2 is a flowchart of Embodiment II of a weighing method with an automatic micro-calibration function according to the present invention.

FIG. 2 is a flowchart of Embodiment II of a weighing method with an automatic micro-calibration function according to the present invention. The method may be carried out on a weighing device 10, such as illustrated in FIG. 3A by way of non-limiting example.

As shown in FIG. 2, the present invention discloses a weighing method with an automatic micro-calibration function, the method comprising: performing an automatic adjustment by a self-calibration weighing module 100, and when the result of the adjustment does not meet a requirement, performing automatic calibration by the self-calibration weighing module 100, and weighing fine formulation materials after the calibration is finished.

Specifically, in this embodiment, the weighing method comprises seven steps.

Step $S_{1'}$ involves installing and connecting a material tank 10 to the self-calibration weighing module 100 and a control system 200.

The control system 200 preferably comprises a meter or a PLC control system. Before formulating starts, the material tank 10, the self-calibration weighing module 100 and the control system 200 (such as a meter or a PLC) have been installed, and a feeding system and a discharging system and other auxiliary systems of the material tank 10 have been installed.

Step $S_{2'}$ involves calibrating data of the material tank 10 by the self-calibration weighing module 100 and weighing large-weight mixed solvents.

Preferably, the weighing process of the large-weight mixed solvents is performed after the material-tank scale data is used first, and the weighing control on the large-weight (e.g., 3000 kg of water) mixed solvents is performed. When all materials have been fed, a fine material calibration mode is implemented.

Step $S_{3'}$ involves switching, by the control system 200, the self-calibration weighing module 100 to an automatic small-range calibration mode, and performing small-range calibration by the self-calibration weighing module 100 by taking a current weight of the material tank 10 as a zero point.

Step $S_{4'}$ involves sending, by the control system 200, an automatic adjustment instruction to the self-calibration weighing module 100.

Preferably, step $S_{4'}$ particularly comprises: triggering an internal software control program by the meter through a mechanical meter button 220 or by the PLC control system through a virtual key 180, and sending, by the software control program, a signal to an automatic loading device 160 of the self-calibration weighing module 100.

Step $S_{5'}$ involves loading the material tank 10 by the self-calibration weighing module 100, and displaying loaded weight data and determining whether the result of the adjustment meets a requirement, by the control system 200, if not, proceeding to step $S_{6'}$, and if yes, proceeding to step $S_{7'}$.

Preferably, step $S_{5'}$ particularly comprises two substeps.

Substep $S_{51'}$ involves performing a loading action by the automatic loading device 160 after receiving the signal.

Substep $S_{52'}$ involves, after loading, displaying loaded weight data by the meter or the PLC control system, comparing the loaded weight data with the mass of loaded weights 163 for the self-calibration weighing module 100 to obtain a weight deviation value, and if the weight deviation value does not meet a requirement, proceeding to step $S_{6'}$; and if the weight deviation value meets the requirement, proceeding to step $S_{7'}$.

Step $S_{6'}$ involves instructing, by the control system 200, the self-calibration weighing module 100 to perform automatic calibration, and proceeding to step $S_{7'}$ after the calibration is finished.

Preferably, step $S_{6'}$ particularly comprises: sending an automatic small-range calibration instruction by the meter or the PLC control system, and performing calibration by the self-calibration weighing module 100 by loading weights 163, such that the precision meets a precision for small-range weighing.

In this case, it is equivalent to the case where the maximum weighing (e.g., 4-8 kg) precision of the whole material-tank weighing system meets the precision for small-range weighing, and weighing control of fine formulation materials is performed after the calibration is finished. The feeding process is: weighing control on fine formulation materials (e.g., 1 kg of material A or 2 kg of material B) is performed by a feeding system of the material tank 10. When the weight of the fine materials added meets a requirement, the system stops feeding.

Step $S_{7'}$ involves performing weighing control on the fine formulation materials by a feeding system of the material tank 10.

When the deviation value meets the production requirements, micro-calibration of the material-tank weighing system is not required, and weighing control on the fine formulation materials (e.g., 1 kg of material A or 2 kg of material B) is directly performed by a feeding system of the material tank 10. When the weight of the fine materials added meets a requirement, the system stops feeding.

Finally, after all materials have been fed, stirring, heating and other processes are carried out to complete the formulating process.

In summary, in the weighing method with an automatic micro-calibration function according to the present invention, the self-calibration module is used to perform the automatic calibration function to weigh the fine formulation materials, having a high degree of automation, and greatly reducing cost in equipment and labor for a formulating process, saving on time and labor, and having no risk of cross-contamination.

Although specific implementations of the present invention have been described above, those skilled in the art should understand that these are merely examples, and the scope of protection of the present invention is defined by the appended claims. Various alterations or modifications to these implementations can be made by those skilled in the art without departing from the principle and essence of the present invention; however, these alterations and modifications all fall within the scope of protection of the present invention.

What is claimed is:

1. A weighing method with an automatic micro-calibration function for material tank scales, said weighing method comprising the steps of:
   installing and connecting a material tank to a self-calibration weighing module and a control system;
   sending an instruction, by the control system, for performing an automatic adjustment to the self-calibration weighing module by, at least, electronically commanding the self-calibration weighing module to load the material tank with a predetermined calibration weight, displaying loaded weight data, and subsequently:
     determining in the control system whether the loaded weight data meets a predetermined requirement;
     only if the loaded weight data does not meet the predetermined requirement, instructing, by the control system, the self-calibration weighing module to perform an automatic calibration;
   weighing fine formulation materials using weighing control on the fine formulation materials by a feeding system of the material tank; and
   switching, by the control system, back to calibrated data for the material tank, and subsequently weighing large-weight mixed solvent materials.

2. The weighing method of claim 1, wherein the control system comprises a meter or a PLC control system.

3. The weighing method of claim 2, wherein the step of sending the instruction for performing the automatic adjustment comprises the steps of:
   triggering an internal software control program, which is part of the control system, by the meter through a mechanical meter button or by the PLC control system through a virtual key, and
   sending, by the internal software control program, a signal to an automatic loading device of the self-calibration weighing module.

4. The weighing method of claim 3, wherein the step of electronically commanding the self-calibration weighing module to load the material tank with the predetermined calibration weight and displaying the loaded weight data comprises the substeps of:
   using the automatic loading device to perform a loading action after receiving the electronic command;
   after loading, using the meter or the PLC control system for displaying the loaded weight data; and
   comparing the loaded weight data with a known mass of loaded weights added by the loading action for the self-calibration weighing module to obtain a weight deviation value, wherein the predetermined requirement comprises an acceptable deviation value range or threshold, and wherein the mass of loaded weights is the predetermined calibration weight.

5. The weighing method of claim 3, wherein the step of performing the automatic calibration comprises the substeps of:
   sending an automatic small-range calibration instruction by the meter or the PLC control system, and
   using the self-calibration weighing module to self-calibrate by loading weights of known mass, such that a measured precision of the weights of known mass meets a precision for small-range weighing.

6. A weighing method with an automatic micro-calibration function for material tank scales, comprising the steps of:

installing and connecting a material tank to the self-calibration weighing module and a control system;

calibrating data of the material tank by the self-calibration weighing module and weighing large-weight mixed solvents;

switching, by the control system, the self-calibration weighing module to an automatic small-range calibration mode, and performing small-range calibration by the self-calibration weighing module by:

taking a current weight of the material tank as a zero point;

sending, by the control system, an automatic adjustment instruction to the self-calibration weighing module;

performing the automatic adjustment by electronically commanding the self-calibration weighing module to load the material tank with a predetermined calibration weight;

displaying loaded weight data;

determining in the control system whether the result of the adjustment meets a predetermined requirement; and only if the result does not meet the predetermined requirement, instructing, by the control system, the self-calibration weighing module to perform an automatic calibration; and performing the step of weighing fine formulation materials using weighing control on the fine formulation materials by a feeding system of the material tank.

7. The weighing method of claim 6, wherein the control system comprises a meter or a PLC control system.

8. The weighing method of claim 7, wherein the step of sending the instruction for performing the automatic adjustment comprises the steps of:

triggering an internal software control program, which is part of the control system, by the meter through a mechanical meter button or by the PLC control system through a virtual key, and sending, by the internal software control program, a signal to an automatic loading device of the self-calibration weighing module.

9. The weighing method of claim 8, wherein:

the self-calibration weighing module uses the automatic loading device to perform a loading action after receiving the electronic command to load the material tank with the predetermined calibration weight; and the step of displaying the loaded weight data is accomplished by using the meter or the PLC control system for displaying the loaded weight data after the loading action is completed, and comparing the loaded weight data with a known mass of the predetermined calibration weight, which comprises loaded weights; and the step of determining in the control system whether the result of the adjustment meets the predetermined requirement comprises the self-calibration weighing module obtaining a weight deviation value between the loaded weight data and the known mass of the predetermined calibration weight, wherein the predetermined requirement comprises and acceptable deviation value range or threshold.

10. The weighing method of claim 8, wherein the step of performing the automatic calibration comprises the substeps of:

sending an automatic small-range calibration instruction by the meter or the PLC control system, and using the self-calibration weighing module to self-calibrate by loading weights of known mass, such that a measured precision of the weights of known mass meets a precision for small-range weighing.

\* \* \* \* \*